United States Patent [19]

Bertagna et al.

[11] Patent Number: 5,057,677
[45] Date of Patent: Oct. 15, 1991

[54] TRANSACTION MONITORING AND SECURITY CONTROL SYSTEM FOR THE SALE AND DISTRIBUTION OF ARTICLES

[75] Inventors: Richard A. Bertagna, San Dimas; Dickey J. Berry, LaVerne, both of Calif.

[73] Assignee: Avicom International, Inc., Glendora, Calif.

[21] Appl. No.: 318,592

[22] PCT Filed: Apr. 14, 1986

[86] PCT No.: PCT/US86/00783

§ 371 Date: Jun. 16, 1988

§ 102(e) Date: Jun. 16, 1988

[87] PCT Pub. No.: WO87/06377

PCT Pub. Date: Oct. 22, 1987

[51] Int. Cl.$^5$ .............................................. G06F 7/08
[52] U.S. Cl. .................................... 235/381; 235/383; 235/385; 364/404; 364/405
[58] Field of Search ............... 235/383, 462, 472, 385, 235/375, 380; 364/403, 404, 405; 340/825.31, 825.35

[56] References Cited

U.S. PATENT DOCUMENTS

| | | | |
|---|---|---|---|
| 3,836,755 | 9/1974 | Ehrat | 235/383 |
| 4,071,740 | 1/1978 | Gogulski | 235/432 |
| 4,373,133 | 2/1983 | Clyne et al. | 235/383 |
| 4,471,218 | 9/1984 | Culp | 235/472 |
| 4,635,053 | 1/1987 | Banks et al. | 340/825.31 |
| 4,698,630 | 10/1987 | Ellsberg | 340/825.31 |
| 4,710,616 | 12/1987 | Utley | 235/472 |
| 4,731,525 | 3/1988 | Hice | 235/472 |
| 4,736,096 | 4/1988 | Ushikubo | 235/472 |
| 4,783,655 | 11/1988 | Cobb et al. | 340/825.31 |
| 4,801,786 | 1/1989 | Stobbe | 235/472 |
| 4,814,592 | 3/1989 | Bradt et al. | 235/383 |
| 4,866,661 | 9/1989 | de Prins | 235/383 |

Primary Examiner—David Trafton
Assistant Examiner—Christopher Glembocki
Attorney, Agent, or Firm—Terje Gudmestad; Jeannette M. Walder; Wanda K. Denson-Low

[57] ABSTRACT

The system includes containers for storing articles to be distributed, and a computer-controlled locking system for controlling access to the articles. The initial inventory of articles stored in the container is bar-coded, and the bar code data provide a digital data record of articles stored and locked in the container. A central computing unit (CCU) includes a housing with locked compartments for receiving and storing a plurality of hand-held portable transaction monitoring units (PTMUs) used to record transaction data from the sale of articles in the container. Each PTMU contains a microprocessor and data storage for communicating with the CCU and with memory in the cart. A security door in the CCU is selectively unlocked for obtaining a selected PTMU only in response to a coded ID input identifying the particular user of the PTMU. The PTMU is then mounted on the article container to off-load a digital data record of the inventory of articles stored in the container. A computer-controlled locking system on the container permits removal of articles from the container only in response to a coded input from the PTMU for actuating the locking system. After sales transactions involving articles removed from the container are completed and recorded in the PTMU, data from the PTMU are off-loaded into digital data transfer and storage means in the CCU in response to the PTMU being returned to its compartment in the CCU.

15 Claims, 6 Drawing Sheets

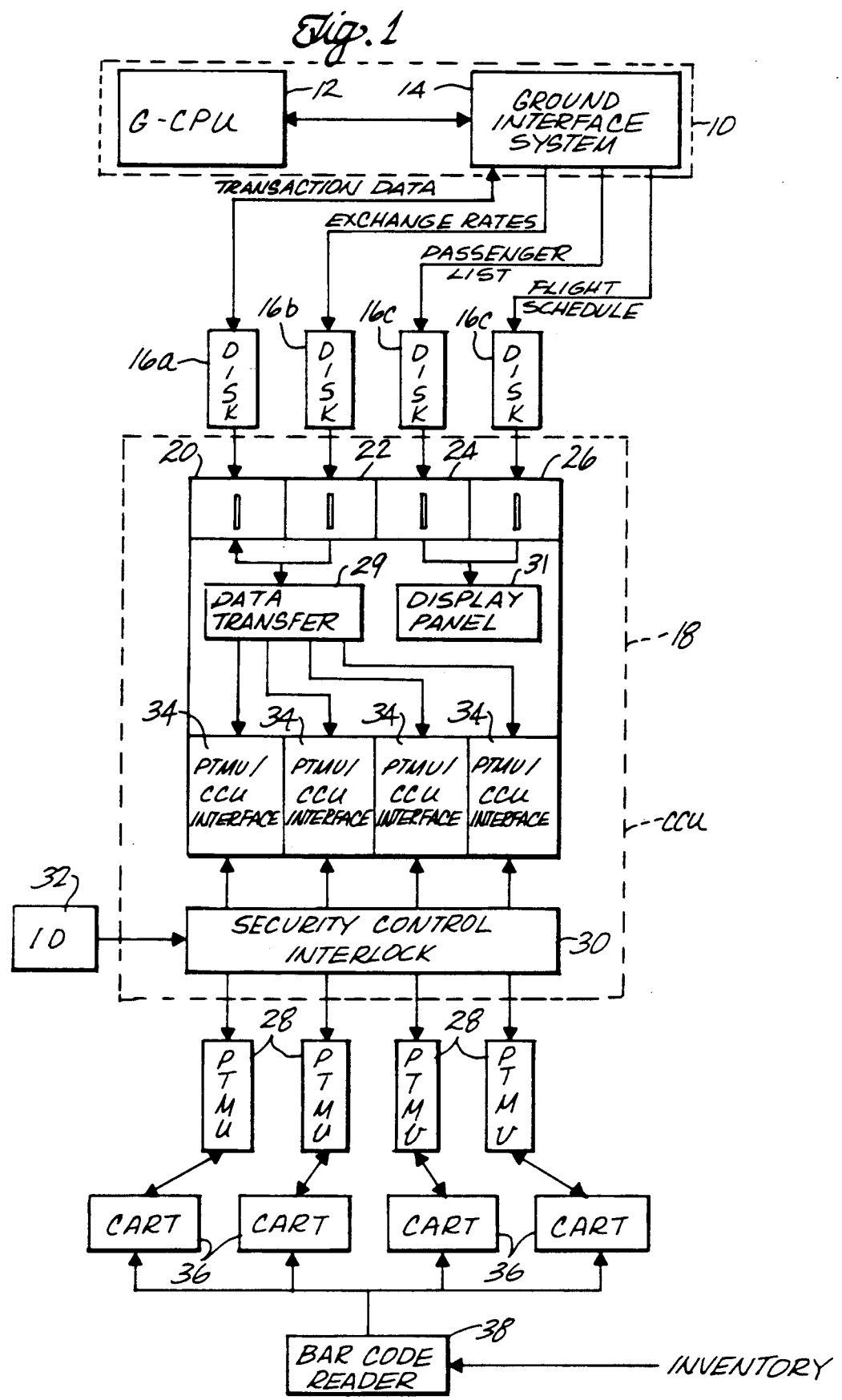

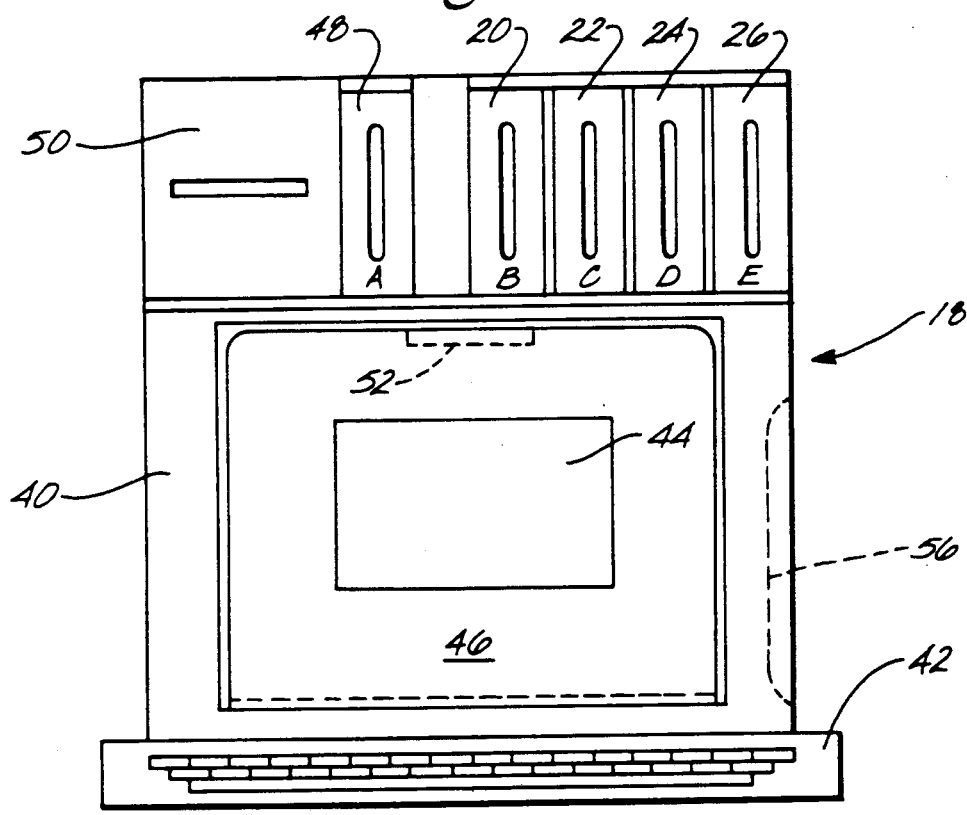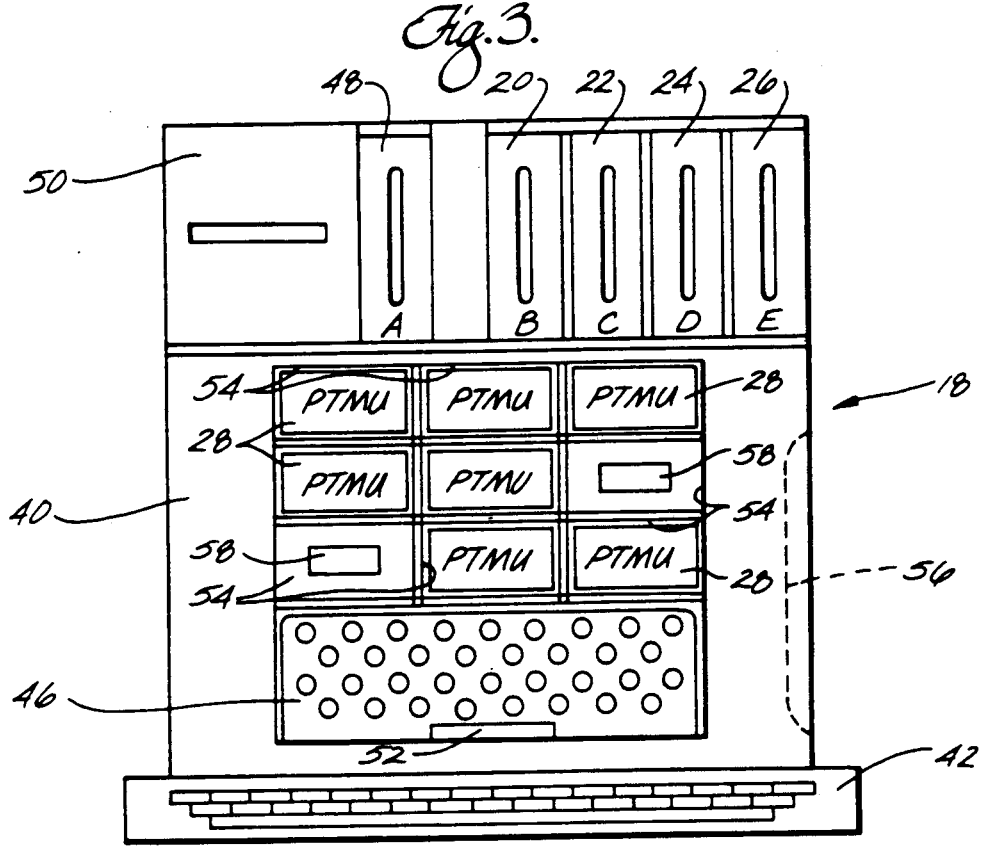

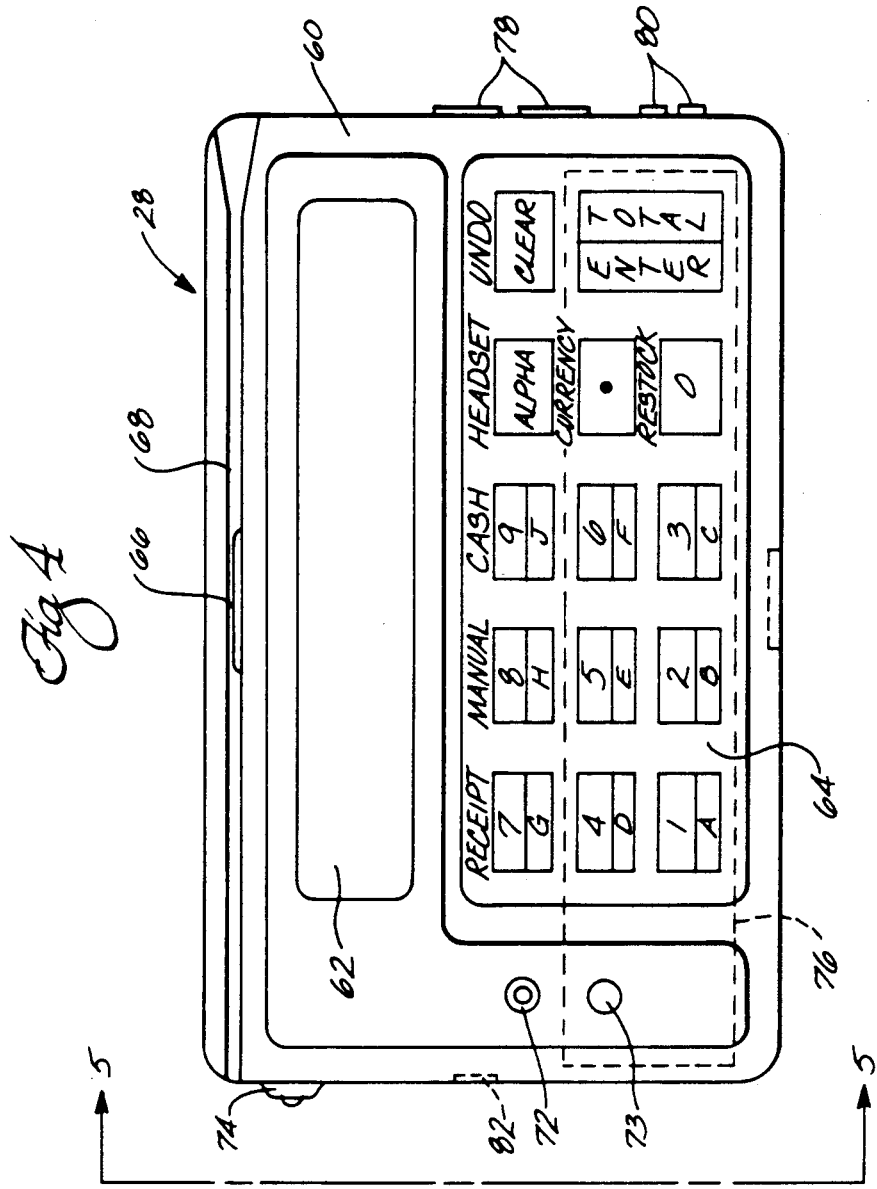
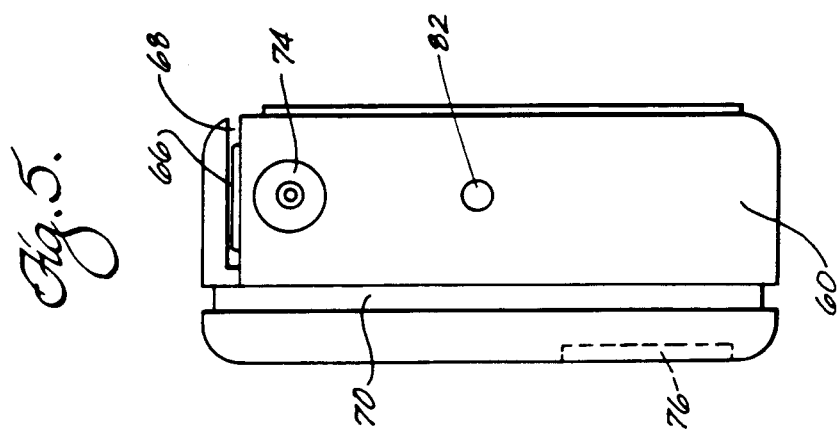

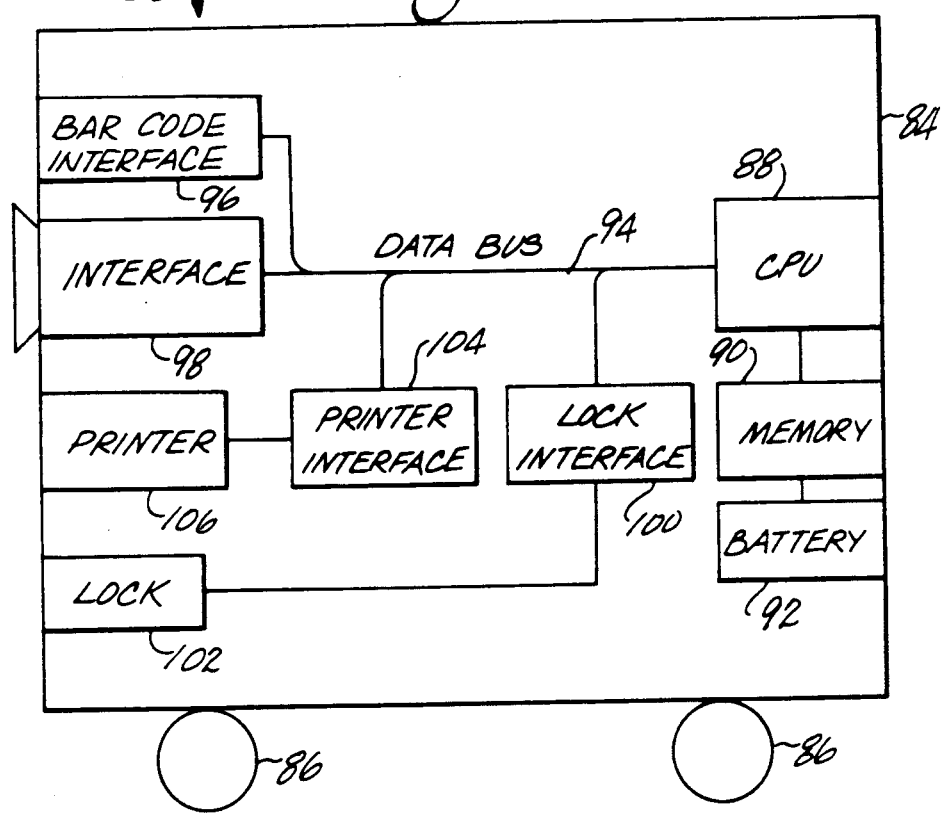

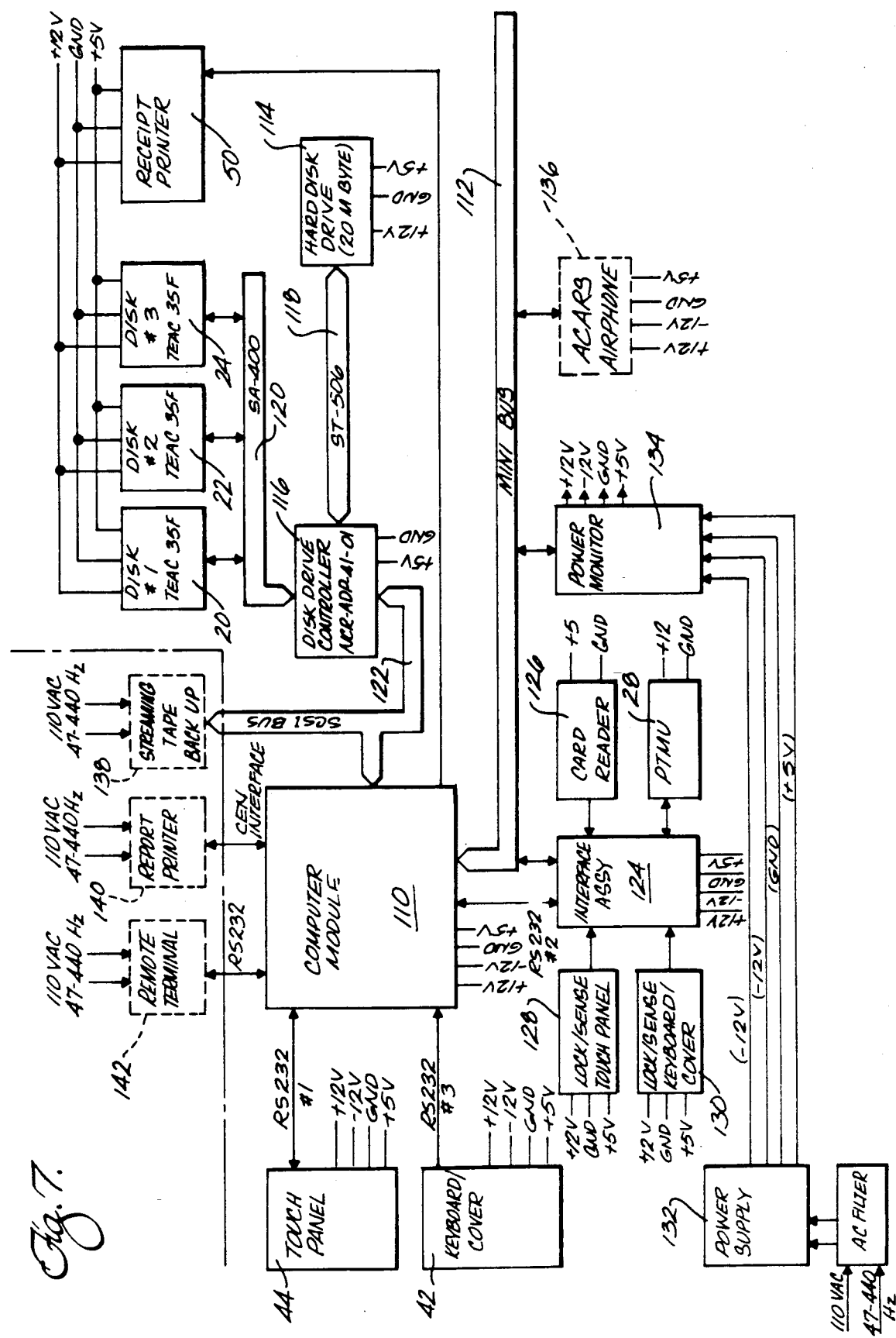

TRANSACTION MONITORING AND SECURITY CONTROL SYSTEM FOR THE SALE AND DISTRIBUTION OF ARTICLES

FIELD OF THE INVENTION

This invention relates to a system for monitoring inventory and sales transactions so that a proper accounting for sales revenue and merchandise can be developed. The system protects against the loss of revenue and merchandise which often occurs without such controls.

BACKGROUND OF THE INVENTION

In many situations, the custody of sales merchandise is entrusted to authorized persons who should be held accountable for the merchandise and the proceeds from sales. One example involves airline onboard sales of duty-free items, beverages such as liquor, and headsets for inflight entertainment. There has been an airline industry problem in recording sales transactions from onboard sales of duty-free items, liquor, and headsets. In fact, the sale of these items onboard airlines represents one of the few instances today where merchandise is sold and cash is received from point-of-sale transactions without any accounting controls. Because of the lack of accurate controls, shrinkage occurs in merchandise and revenue from such sales. Most duty-free items are expensive, and this increases the temptation for dishonesty. If a system were available to ensure security for onboard sales of duty-free items, sales of such items could be greatly increased and produce a new profit center for the airlines. The onboard sale of liquor to passengers produces substantial revenue for the airlines, but such sales annually cost the airlines millions of dollars in lost merchandise and revenue because of difficulties in controlling inventory and accounting for cash receipts. It has been estimated that some airlines each lose several millions of dollars annually because of unrecovered cash receipts from the sales of headsets alone.

Thus, there is a need to develop a system of controls over merchandise and proceeds from sales to airline passengers. The system of controls should be convenient and easy to use by flight attendants at the point of sale and during other steps in the process of handling inventory and producing accounting records. The system also should accurately provide the necessary audit trail for merchandise and payments involved for all transactions so as to effectively prevent shrinkage of merchandise and revenues. Such a transaction monitoring and security system can, if properly implemented, also produce substantial revenue increases for the airlines not only because of the increased security, but also by encouraging greater onboard sales of merchandise. The airlines would be more agreeable to increasing the goods available for sale onboard the aircraft if security were improved, and passengers would find it more convenient to purchase goods through inflight credit card transactions made available by such a system.

SUMMARY OF THE INVENTION

The present invention provides a transaction monitoring and security system useful in controlling and accounting for inventories in merchandise sales transactions handled by a number of merchandise sales clerks or attendants, while providing revenue reporting and accounting for the proceeds from the merchandise sales transactions. The system is convenient and easy to use by the operator or attendant at the point of sale and when up-loading and down-loading the sales and inventory information. The system is especially useful for the airlines because of its convenient and accurate controls and accounting of sales transactions and inventory involved in the onboard sale of duty-free items, liquor and headsets. However, the invention also is useful in other applications where it is desirable to monitor and account for sales transaction data involved in the sale and distribution of valuable items.

Briefly, one embodiment of the invention provides an interactive data transfer and inventory control system which includes a plurality of containers for storing articles to be distributed and a plurality of portable transaction monitoring units, each adapted to be operatively mounted on any one of the containers to generate a digital data record of the inventory of articles in the container and thereafter of each article removed from the container for distribution. The containers each have locking means permitting removal of the articles from the container only while a portable transaction monitoring unit is operatively mounted on it. A central computing unit has a housing with compartments formed in it for receiving and storing the plurality of the portable transaction monitoring units. The central computing unit includes digital data transfer and storage means for off-loading data from the portable transaction monitoring units to the data storage means in response to the portable transaction monitoring units being inserted into the compartments. Normally locked door means control access to the compartments, and security means selectively unlock the door means in response to any of a plurality of coded inputs to (1) permit access to the compartments for removal and return of the portable transaction monitoring units, and (2) make a record of any portable transaction monitoring units removed from the central computing unit as well as the coded input used to actuate the security means.

The invention is useful as a transaction monitoring and security system for the sale of articles onboard airlines. The containers for storing the articles to be distributed are in the form of beverage and duty-free carts, each having memory means for storing data representing an initial inventory of the articles contained on the cart. Before gaining access to the articles on the cart, the flight attendant first obtains a portable transaction monitoring unit (PTMU) stored in a locked housing in a central computing unit. Alternatively, the locked housing containing the portable transaction monitoring units can be separate from the central computing unit, but access to the housing is gained only through prior communication from the central computing unit. Each PTMU is obtained only after the attendant's personal identification data are communicated to the central computing unit which, in turn, selectively unlocks a door in the housing for providing access to an assigned PTMU. Information communicated to the central computing unit makes a digital data record of the identity of the attendant who has removed the PTMU. The cart which contains articles for distribution also includes locking means to permit removal of articles from the cart only when the PTMU is first operatively mounted on the cart. The cart contains internal digital data storage for information identifying the articles on the cart available for sale and distribution. These data can be off-loaded into the memory within the PTMU. The PTMU has a bar code scanner and reader for making an internal digital data record of articles removed from the cart when sold. The PTMU also generates an internal digital data record of the cash and credit card receipt information from sales by the attendant. Alternatively, the PTMU can remain on-line to the processor in the cart and all updating of inventory and cash receipts data can take place in data storage within the cart. When sales transactions are completed, transaction data are off-loaded into the PTMU, and the flight attendant closes and locks the cart and returns the PTMU to its proper container in the housing. When the PTMU is placed in the compartment in the housing, it communicates with data storage means in the central computing unit for off-loading the transaction data from the PTMU to the central computing unit to provide a digital data record of sales receipts and articles sold by the attendant.

Thus, when all transactions are completed and the flight attendant closes and locks the cart and returns the PTMU to the central computing unit, the central computing unit provides a record of all transactions, while providing a security control for inventory involved in the transactions.

Use of the invention for transaction monitoring and security control of articles sold onboard airlines is one example only of a system for carrying out the principles of the invention. Other embodiments of the invention and the techniques according to which its principles may be applied will be more fully understood by referring to the following detailed description and the accompanying drawings.

DRAWINGS

FIG. 1 is a simplified schematic block diagram illustrating the general form of one embodiment of a transaction monitoring and security control system according to principles of this invention.

FIG. 2 is a front elevation view showing a central computing unit having a housing in a locked position.

FIG. 3 is a front elevation similar to FIG. 2 but showing the housing in its unlocked position.

FIG. 4 is a semi-schematic elevation view illustrating the front face of a portable transaction monitoring unit.

FIG. 5 is a side view taken on line 5—5 of FIG. 4.

FIG. 6 is a schematic view illustrating components and simplified functions of an inventory control cart.

FIG. 7 is a more detailed schematic block diagram illustrating functions of a central computing unit.

DETAILED DESCRIPTION

Figure 8:
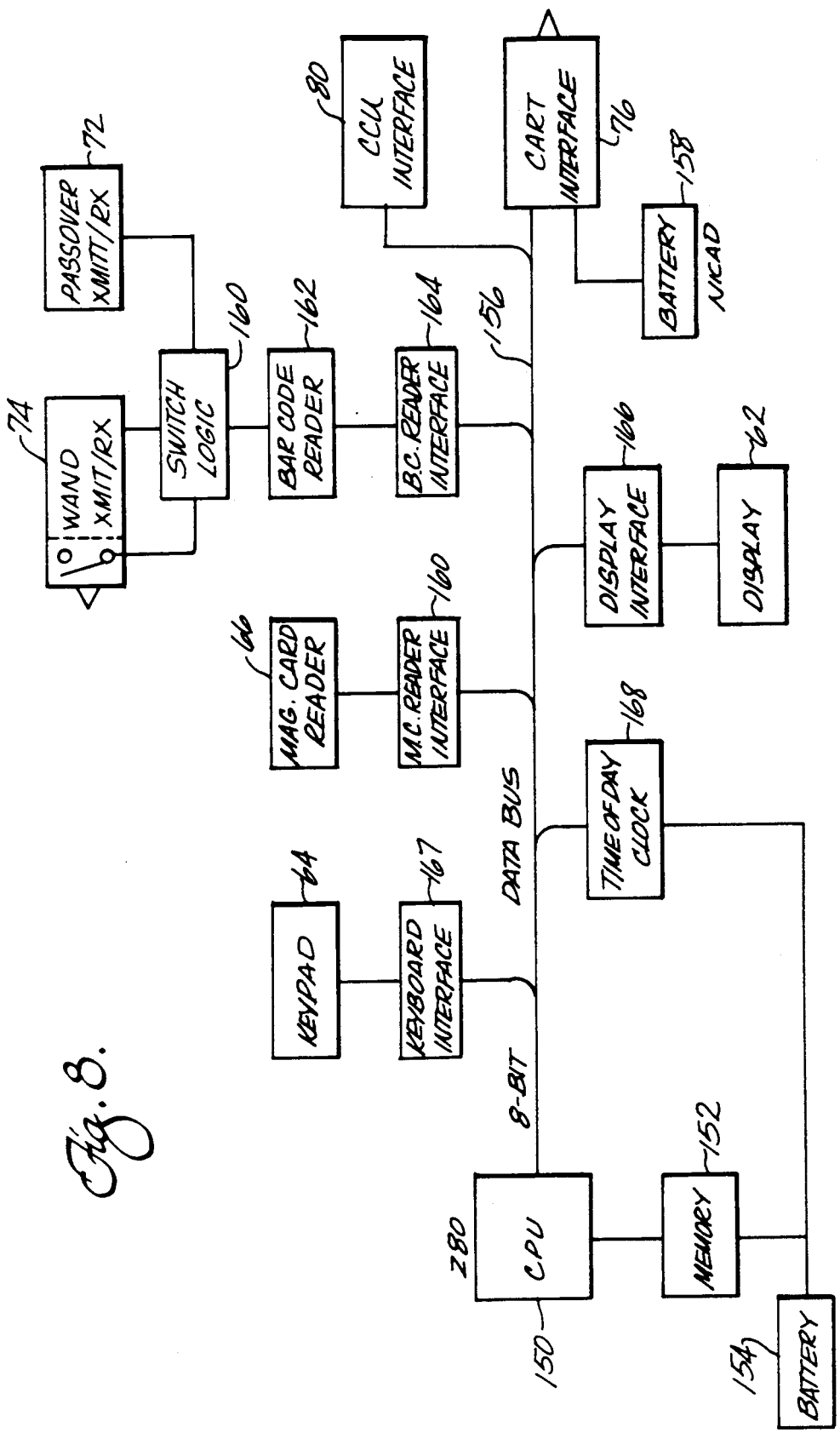
FIG. 8 is a schematic block diagram illustrating functions of the portable transaction monitoring unit.

FIG. 1 is a simplified schematic block diagram illustrating the general principles of a preferred embodiment of a transaction monitoring and security control system. Following an introduction to the general principles of the system, its major elements are more fully described in separate portions of the detailed description.

The system is preferably used in a common carrier aircraft. It involves a system for monitoring and controlling merchandise inventory and sales receipts from articles sold onboard the aircraft. However, other applications of the system are possible and will be described in greater detail below.

Referring to the embodiment of FIG. 1, a ground control area 10 of an airport includes a central processing unit 12 which communicates with a ground interface system 14. The ground interface system includes means for storing data base records under the control of the main ground level processor 12. The main processor 12 responds to computer program instructions stored in a read-only-memory (ROM) in accordance with known program control principles to control inputting of data, the processing of data, the storage of data, and the outputting of data. The ground interface system 14 includes a random-access-memory (RAM) for the storage of data and for the transfer of data useful for the flight crew of a particular aircraft on which the transaction monitoring and security control system is used. The ground interface system receives a variety of flight information and data from the main processor and records the information for further use. The ground interface system 14 includes a disk drive system for accepting and recording data on minifloppy disks 16 to be used in a central computing unit (CCU) 18 onboard the aircraft. Once the flight crew present themselves at the cash room at the terminal, the cash room operator initiates the down-loading of data from the ground interface system to the minifloppy disks 16 by keying in a request for down-load of data for that particular flight. Once the down-load of data is complete, and the data are checked for errors automatically, the operator is prompted to remove the now-ready disks 16 and deliver them to the flight crew. The data down-loaded onto the disks can vary; and, in one embodiment, these data include transaction data storage files on a down-load disk 16a for recording transaction data for articles to be sold onboard the aircraft and whose inventory and cash receipts are to be controlled. In the illustrated embodiment, the down-loaded data also include fight schedules on a disk 16d, a passenger list on disk 16c, and currency exchange rates on a disk 16b. Other data useful for onboard data storage and passenger and flight information also can be transferred to these or other disks.

The minifloppy disks 16 collected by the flight crew at the ground station are then inserted into separate minifloppy disk drives 20, 22, 24, and 26 contained in the central computer unit 18 onboard the aircraft. The CCU includes data storage means under the control of a microprocessor contained in the CCU housing. The CCU microprocessor automatically down-loads the data on the disks into its internal memory. Data are automatically transferred to the CCU data storage using a smart terminal interface and automated disk drive system. System program instructions also are input into the CCU processor from a rigid disk (not shown in FIG. 1). These system program instructions are transferred to the processor in the CCU as described in more detail below.

After the data and program instructions on the minifloppy disks have been down-loaded into the CCU memory, the data can be used by the flight crew during the flight from options available in a menu displayed on a panel on the CCU. One option is the transaction monitoring and security control system, which uses and stores transaction information on the minifloppy disk 16a inserted into the disk drive 20. Exchange rate data from the disk 16b inserted into the disk drive 22 also are used in the transaction monitoring system. The data on these disks are down-loaded into the memory in the CCU for use in conjunction with other program instructions in the CCU.

The CCU housing contains a number of portable transaction monitoring units 28, each of which is used in recording transaction data from the sale of articles onboard the aircraft. The PTMU's communicate with the microprocessor and data storage in the CCU through a data transfer system 29. The PTMU's 28 are locked in a secure location within the CCU housing with access to the PTMU's under the control of the processor in the CCU. A security control interlock system 30, controlled by program instructions from the CCU, unlocks the portion of the housing containing the PTMU's, in response to personal identification information at 32 input from the attendant desiring to use a PTMU in performing sales transactions. Once the security control interlock system permits access to the PTMU's, the CCU transfers operating instructions to the next available PTMU, together with currency exchange rate data. To provide security, only one of the PTMU's is made operational in response to the ID information input, and the CCU makes an internal digital data record of the identity of the attendant assigned to the next-available PTMU. The PTMU available for use indicates to the user that it is operational, and all remaining PTMU's are left non-operational. The CCU processor and PTMU communicate through various interfaces 34 in portions of the CCU in which the PTMU's are stored.

Articles available for sale are stored and locked in merchandise storage carts 36 which provide a convenient means for transporting the articles throughout the cabin portion of the aircraft. Prior to any sales transactions, the inventory in each cart 36 is recorded by a bar code reader 38 as articles from inventory are placed on each cart. Each cart also includes data storage means under the control of an internal microprocessor for use in recording the bar code information to develop an inventory record of all articles contained in the cart prior to any sales transactions. The carts also include locking means for permitting removal of articles from each cart only in response to a communication from a PTMU. Once a flight attendant has obtained a PTMU from the CCU, the PTMU is then mounted on the cart so that the PTMU communicates with the internal data storage and processor in the cart. Upon an appropriate input from the PTMU, the cart is automatically unlocked to permit the attendant to gain access to the articles stored in the cart. The PTMU also can download inventory information from the memory in the cart to provide an internal digital data record in the PTMU of the articles contained in the cart.

The PTMU is a portable unit. It can be carried by the attendant and used to record sales transaction data and to deduct articles from inventory remotely from the cart. Alternatively, the PTMU can remain on-line to the cart and all transaction data can be input only to the memory in the cart; or these data can be shared by the data storage in the cart and the PTMU. As articles are sold, data identifying articles removed from the cart are deducted from the inventory record in the digital data storage contained in the PTMU and/or the cart. Other details of the PTMU are described more fully below.

When sales transactions are completed, the cart is locked and the PTMU processing system balances the expected collections against the declared collection indicated by the attendant. Imbalances are indicated. The PTMU also has generated an internal digital data record of the articles sold. The PTMU is returned to the CCU, and all data are down-loaded through the PTMU interface 34 to the memory in the CCU. Data from the CCU are later down-loaded onto the minifloppy disk 16a to provide data for producing an accounting record of cash receipts and inventory for the particular attendant assigned to the inventory contained in the cart.

FIGS. 2 and 3 illustrate one embodiment of a housing 40 for the CCU 18. The housing has a hollow interior for containing components of the CCU, including a microprocessor, a power supply, a hard disk drive for a back-up data storage system, a disk drive controller for the minifloppy disks used in the CCU, a printer, a battery charging system, and other components described below. The front panel of the CCU housing has a fold-down outer door (not shown) for providing access to internal portions of the CCU illustrated in FIGS. 2 and 3. A keyboard 42 below the front panel may be used for inputting information into the processor contained in the CCU, although its use is not necessary for the transaction monitoring and security system of this invention. The front face of the housing also includes the minifloppy disk drives 20, 22, 24, and 26 mounted on an upper portion of the housing above a touch panel 44. The touch panel is mounted in a portion of a fold-down security door 46 on the front face of the CCU. The disk drives, security door, and touch panel are exposed when the outer door covering the front face of the entire unit is opened. An additional rigid disk drive 48 is mounted above the touch panel to provide system operating instructions. Adjacent the system operating disk drive 48 is a printer unit 50 for producing a printed record of sales transaction data.

The security door 46 is shown in its locked position in FIG. 2. A processor-controlled latching system 52 controls locking and unlocking of the security door. FIG. 3 shows the security door in its folded-down, unlocked position for providing access to a plurality of independent storage compartments 54 inside the CCU housing. The storage compartments each contain a separate one of the hand-held PTMU's 28. In order to open the door to gain access to the PTMU's, the latching system 52 is actuated for unlocking the door in response to a coded command from the processor in the CCU. The coded command can be in response to personal identification information from the attendant desiring to gain access to the PTMU's. The front portion of the housing can have a slot 56 for a magnetic card reader for receiving a magnetic ID card or other personal identification number (PIN) data, for providing the identity of the person accessing the PTMU's.

The outer door panel for the CCU housing also can include a security interlock system for opening only in response to a coded command, such as from ID information identifying the person gaining access to the CCU.

Each compartment 54 in the CCU contains a separate interface connection 58 from hardwire contacts in the compartment to provide a data interface for the transfer of data between data storage in the CCU and data storage in each PTMU latched in the compartments. FIG. 3 schematically illustrates the data interface means 58 in compartments from which PTMU's have been removed. Separate hand-held PTMU's stored in the remaining compartments also are illustrated. Once the PTMU's are accessed, the processor in the CCU enables only one of the PTMU's for use, and any data from the minifloppy disks contained in the CCU are downloaded into the operational PTMU. The interfaces 58 provide means for transferring to data storage in the CCU the identity of the PTMU removed from the CCU, as well as the coded input used to actuate the security interlock in order to gain access to the PTMU's. This provides a digital data record of the person who removes the enabled PTMU from the CCU compartment.

The touch panel 44 is a resistive-type (sensitive to the touch) panel for inputting system control (menu-driven) functions. The touch panel can provide a means for displaying information, such as passenger lists and flight schedules, from the minifloppy disks stored in the disk drives of the CCU. The touch panel display also can provide prompting information to assist the attendants in the various steps necessary for carrying out the transaction monitoring and security system.

The magnetic card reader can be the type used to read standard, single-sided magnetic stripe cards when the card is passed through the card reader slot 56 located at the side of the CCU housing. In one embodiment, the card reader can read Track 1 and Track 2 of a magnetic stripe encoded as follows. Track 1, developed by the International Air Transportation Association, contains the alphanumeric information for automation of airline ticketing or other transactions where a reservation data base is accessed. Track 2, developed by the American Bankers Association, contains numeric information for automation of financial transactions. This track of information is also used by most systems that require an identification number and a minimum of other control information. A similar magnetic card reader can also be used on the PTMU's, as described in more detail below.

Each PTMU compartment 54 in the CCU also contains two hard contacts (not shown) for connecting battery-charging voltage from the CCU to each PTMU. A charging circuit can be located internally within the CCU housing. Battery-charging is under microprocessor and thermostatic control, and the battery in each PTMU can be charged automatically when each PTMU is properly latched into the compartment when returned after use.

Other functions of the CCU will be described in greater detail below in connection with the functional block diagram of FIG. 7.

FIGS. 4 and 5 schematically illustrate the exterior configuration of a PTMU 28. These illustrations are for one embodiment only, inasmuch as other arrangements also can be used for carrying out the functions of the PTMU without departing from the scope of the invention. The PTMU embodiment illustrated in FIG. 5 includes an exterior housing 60 shaped to be held by hand or easily carried on the user's arm when recording sales transaction information. The housing includes a display 62 on a front face of the housing for displaying information relating to each transaction, such as an identification of the particular item being sold, its price, sales data such as cash receipts or credit card information, and any balance due from the transaction. The display also can provide currency exchange rate information and provide information on the balance due from a transaction in either domestic or foreign currency. Other transaction information also can be provided on the display 62, where necessary. The display is preferably a two-line, 24-character liquid crystal display.

A keypad 64 is located on the front face of the PTMU below the display 62. The keypad is an impermeable pad with tactile feedback. The keys on the keypad provide data entry and facilitate various transactions, such as cash receipt information, foreign currency received, and the like.

A magnetic card reader located at the top of the PTMU above the display panel has a magnetic head 66 for reading standard, single-sided magnetic stripe credit cards when the credit card is passed through a card reader slot 68 extending across the front face of the PTMU. The card reader will read Track 1 and Track 2 of a magnetic stripe encoded as described above. The magnetic card reader and the processor inside the PTMU also can be used to process personal identification information input from the attendant via a magnetic card inserted in the card reader.

The PTMU housing is grooved on four sides to allow for mounting the PTMU in the compartments of the CCU and for mounting the PTMU on one of the mobile carts 28 described in more detail below. A portion of the mounting groove is shown at 70 in FIG. 5.

The PTMU housing also includes a bar code reading system, and, in the illustrated embodiment, the PTMU has two different types of bar code scanners. A first bar code scanner 72 is located on the front face of the PTMU housing and is used when the PTMU is attached to a mobile cart or other stationary location. This scanner is referred to in the art as a pass-over scanner. An article removed from the cart is drawn across the scanner 72, and an ID input 73 is activated to indicate that a good bar code has been read and loaded into the PTMU data storage. A second bar code scanner 74 is located on the side of the PTMU housing and is used when the attendant holds the PTMU by hand to read a bar code. This scanner is referred to in the art as a wand scanner. The pass-over scanner is active for use when the wand scanner is inactive. The wand scanner is active when the scanner tip is pressed against the bar code while swiping (i.e., pressing the tip against the bar code actuates the scanner). An audio feedback beep tone is produced when a good bar code has been read and loaded into the PTMU data storage.

The interior of the PTMU housing also includes a battery-powered microprocessor. Data are transmitted to and from a central processing unit within the PTMU. The central processing unit within the PTMU receives information, when accessed, via the keypad entry, bar code readers, magnetic strip reader, and an IR communications link 76 on a rear face of the PTMU housing. Data and the application program are up-loaded or down-loaded via the central processing unit's IR link to the CCU 18. The IR link 76 also provides communication to a microprocessor in the cart 36 and its attached printer, described below. The PTMU display indicates pertinent data after a magnetic card has been read, and after a bar code or other input has been read. These data load into a nonvolatile memory for access later and to up-load to the CCU at a later time. The PTMU maintains current data via the down-loads from the CCU disk drives. The PTMU contains its own batteries (for portability) and a charging circuit for recharging the batteries when the PTMU is returned to its compartment 54 in the CCU. Battery-charging contacts 78 are located on a side of the PTMU. The contacts 78 are hard contacts that connect battery-charging voltage from the CCU to the PTMU. The charging circuitry is located inside the CCU. The battery-charging circuit is under software-controlled, battery thermal sensing. A thermal fuse (not shown) may be incorporated as a back-up in case of processor or software failure.

Data terminals 80 on the PTMU housing below the battery-charging terminals provide communications to the hardwire contacts in the compartment of the CCU when the PTMU is latched in a compartment 54 in the CCU.

An LED 82 on a side of the PTMU housing indicates that the unit is on and ready for operation. The PTMU can automatically go into a low-power mode after the unit activity has ceased for a preset period of time, to conserve energy. All data retained in the PTMU can be immediately retrieved when actuated by any turn-on switch.

The transaction monitoring system provides security for articles stored on the carts 36. These can be in the form of an onboard catering truck commonly used on the airlines for inflight sales of items to passengers. The catering truck commonly used for the storage of items for inflight sales is modified for use with the transaction monitoring system of this invention. FIG. 6 schematically illustrates components of the modified portions of the catering truck 36. The catering truck can include an outer frame 84 for supporting several vertically spaced-apart shelves for storing the articles to be sold. Rollers 86 at the base of the cart provide mobility. The portion of the cart frame which stores the articles is enclosed around its exterior so that access to each storage area of the cart is provided only through locked doors. At ground level, the cart is initially stocked with articles to be sold. All articles contained on the cart are bar-coded, and a digital data record is made of the inventory of articles contained on each cart by a bar code scanner (not shown). As articles are placed on the cart, the bar code on each article is scanned by the bar code scanner to provide the digital data record of the articles contained on the cart. The record of inventory on the cart can be made using a wand-type bar code scanner, or by using the bar code scanner on a PTMU. After the inventory is recorded, the doors on the exterior of the cart are locked to prevent further access to the articles except through authorized personnel onboard the aircraft.

Referring again to FIG. 6, the cart 36 contains an onboard central processing unit 88 which communicates with data storage in a memory 90. The processing and data storage system is powered by an onboard battery 92, and an onboard battery-charging system can be provided. A data bus 94 provides communication between the central processing unit 88 and a bar code interface 96 and a PTMU interface 98. The bar code interface is located on the exterior portion of the cart for access by an external bar code reader (not shown). The PTMU interface is located on the exterior of the cart for communication from one of the PTMU's retrieved from the CCU. The central processing unit 88 on the cart also communicates through the data bus 94 with a lock interface 100 for controlling an exterior lock system 102 for the doors on the cart. The central processing unit further communicates, via the data bus 94, with a printer interface 104 controlling a printer 106 to provide a record of information stored in the memory of the central processing unit.

When bar-coded articles have been stored on the cart, and the doors to the cart have been locked, the bar code reader used at ground level to record the bar code data from the inventory of stored articles is then used to off-load the data into the memory 90 onboard the cart by coupling the bar code reader into the bar code interface 96 on the cart. The bar code reader can be a wand-type reader and scanner which can be plugged into a socket on the cart to off-load the bar code data into the data storage on the cart. This provides an internal digital data record of the articles stored and locked in the cart. The attendant gains access to the articles stored in the cart by actuating the cart locking system 102 through use of a PTMU previously retrieved from the CCU. The exterior of the cart can include a receptacle (not shown) for latching the PTMU onto the cart to provide communication between the PTMU and the processor and memory in the cart through the PTMU communications interface 98 onboard the cart. Access to the articles contained in the cart can be gained only through a system input from a corresponding personal identification number (PIN) on a magnetic card which the attendant inserts into the magnetic card reader 66 on the PTMU when the PTMU is communicating with the processor on the cart. The memory in the cart provides a digital data record of the identity of the attendant an generates an output signal to the door locking system 102 through the lock interface 100 for unlocking the doors to the cart. The attendant also off-loads the bar code data from the onboard memory 90 into the PTMU so that the PTMU used in transacting sales of articles from the cart contains an internal digital data record of the articles initially contained on the cart. When transactions using the PTMU are completed, the PTMU is again latched to the PTMU interface 98 on the cart, and data from sales transactions are off-loaded into the memory 90 on the cart to provide a record of the articles sold. The printer 106 can be actuated to provide a printed record of the inventory before and after the sales transactions. The cart also is locked after transactions have been completed.

FIG. 7 is a schematic block diagram illustrating the circuitry and computer-controlled functions of the CCU 18. The CCU includes an integrated computer module 110, such as the ICM 3216 available from NCR. In the illustrated embodiment, the integrated computer module is a 32-bit microprocessor having four RS-232C serial ports, one parallel printer port, a small computer system interface (SCSI), and a synchronous 16-bit mini bus interface 112, all mounted on one circuit board. The system memory resides on a second circuit board of the integrated module complement. For the mass storage of data, this system includes a 20-megabyte hard disk and a hard disk drive 114, such as a Winchester drive. The hard disk drive communicates with a disk drive controller 116 through a bus interface 118. A plurality of minifloppy disk drives also communicate with the disk drive controller, and the illustrated embodiment shows the three floppy disk drives 20, 22, and 24 communicating with the disk drive controller 116 through a bus interface 120. The minifloppy and hard disk drives interface to and from the microprocessor through a standard SCSI bus interface 122.

The receipt printer 50 is operated via output signals from the microprocessor for printing data contained in data storage on any of the minifloppy disks in the disk drives 20, 22, or 24.

The microprocessor 110 also communicates with a peripheral interface board 124 through an RS-232 port and through the mini bus interface 112. One input to the interface 124 is from a magnetic card reader 126 for reading data from a magnetic ID card inserted in the card slot 56 on the exterior of the CCU housing. The interface assembly provides communication to the microprocessor 110 for decoding the magnetic ID card data to provide a digital data record in memory of the identification of the person seeking entry to the PTMU section of the CCU housing. Another input to the interface assembly 124 is from the hardwire communications link with the PTMU 28. This communications link provides the means for enabling the PTMU prior to its removal from the CCU housing, to off-load data from any of the floppy disks into the memory contained in the PTMU, and to down-load data from the PTMU to the memory in the CCU after the PTMU has been returned to its compartment in the CCU housing. The interface board 124 also performs a communications link for locking and unlocking the touch panel 44 through the lock sensing system illustrated at 128; and the interface also controls locking and unlocking functions for the main CCU housing cover through a control input illustrated at 130.

The CCU includes its own internal power supply 132 communicating with the processor 110 through a power monitor 134 linked to the processor through the mini bus interface 112.

The main CCU keyboard can communicate with the processor through an RS-232 port connection, and communications also can be provided between the touch panel 44 and the processor through a separate RS-232 port connection.

The CCU software can be developed by one skilled in the art and can provide such features as menu driven user interaction, performing data base management functions, producing automatic on-load/off-load operation, providing built-in self-test diagnostics, providing for easily upgradable files, calculating exchange rates, providing inventory files, and performing system back-up.

Other optional features also can be included in the CCU application program. These can include interfacing with the mini bus 112 to provide an aircraft communication and reporting system (ACARS) and an Airphone communications link from onboard the aircraft to ground level. Other options can include a streaming tape back-up 138 communicating with the microprocessor through the SCSI bus interface, an optional report printer communicating with the processor through a separate interface, and a remote terminal 142 provided by an RS-232 port.

FIG. 8 illustrates components of the internal circuitry and computer-controlled functions of the PTMU 28. The PTMU is controlled preferably by an 8-bit HD 64180 microprocessor 150 manufactured by Hitachi. A random-access memory 152 communicates with the central processing unit 150. The system is powered by a 7.2VDC nicad battery 154. The microprocessor memory is contained in one 127C64 EPROM. The working data and application program are stored in 256K bytes of static RAM memory. High-order address bits go to the decoder for the memory select. Input/output requests are controlled by an IORQ signal and low-order address bits into a 3-8 decoder and D-latch logic for peripheral use. The microprocessor is a serial input/output programmable, dual-channel device which provides formatting of data for serial communication. The magnetic card reader 66, a bar code reader, and to the other peripheral devices described below.

The central processing unit 150 communicates with the processor in the CCU 18 through hardwire communications interface 80; and it communicates with the processor in the cart 36 through the IR communications interface 76. Both interfaces 76 and 80 are linked to the CPU 150 through a communications interface bus 156. Data and application program are up-loaded and down-loaded via the central processor unit's hardwire link to the CCU through the interface 76. The interface 76 also provides communications via the IR link to the cart and its attached printer. A separate nicad battery 158 provides power for the microprocessor link to the communications interface 76.

The bar code scanners 72 and 74 are each separately coupled to the central processing unit 150 through a logic switch 160 and a bar code reader 162. Information from the bar code reader communicates with the central processing unit through an interface 164 to the data bus 156. Bar code data from the scanners is decoded by the bar code reader 162, and the resulting digital data information is loaded into the non-volatile memory for access later and to up-load to the CCU at a later time.

The magnetic card reader 66 communicates credit card and ID information to the central processing unit 150 through a magnetic card reader interface 160 communicating with the processor through the data bus 156.

The display 62 also communicates with the central processor 150 through an interface linked to the data bus 156. The PTMU display 62 indicates pertinent data after a magnetic card or a bar code has been read. The magnetic card data loads into the non-volatile memory 152 for access later and to up-load to the CCU. The PTMU memory also maintains current data via down-loads from the CCU through the interface 76.

The key pad 64 on the front face of the PTMU communicates with the central processor 150 via data decoded in a keyboard interface 167 and communicated to the processor through the data bus 156.

The system also can include a time-of-day clock 168 having a battery back-up provided the battery 154.

Use of the transaction monitoring and security system will now be summarized. The ground level processing system down-loads data onto the minifloppy disks for use in the CCU. For the monitoring and security system, these data include random-access-memory accounting files for the down-load disk 16a and exchange rate data for the disk 16b. Once the flight crew boards the plane, the outer door to the CCU is opened, using an employee magnetic ID card, by passing it through the magnetic card reader on the exterior of the CCU. Opening the outer door provides access to the minifloppy disk drives, and the minifloppy disks obtained at ground level are inserted into the disk drives. The CCU then automatically down-loads the data from the disks into the CCU memory as each disk is properly inserted. After the initial down-load process has been completed, the outer door to the CCU housing can be closed.

At ground level, articles stored in the catering trucks or carts are separately bar-coded so that a digital data record is generated for the inventory contained in each cart. The inventory record comprises bar codes (identifying inventory) and counts representing the amounts of each item available in stock. The security doors on the exterior of each cart are then locked to prevent access to the inventory contained on the carts.

Access to the articles contained in the locked carts then can be gained only by first obtaining a selected PTMU from the PTMU storage region of the CCU housing. In selecting PTMU operation, the user passes a magnetic ID card through the magnetic card reader on the exterior of the CCU housing. PIN identification information also can be used and the CCU processor can internally check the PIN number with the ID information in its file to properly match the ID information before automatically opening the outer door to the CCU housing. Once the outer door has been opened, an operations menu is displayed on the display panel inside the CCU. One option displayed can be use of a PTMU for sales and distribution of merchandise. Once the choice is made for PTMU operation, the security door can be unlocked, preferably by first requiring ID information such as from a magnetic card or PIN number to provide a coded data input signal to unlock the security door latching mechanism. Once the security door is opened, the PTMU storage region of the CCU is revealed. The CCU down-loads operating instructions to the next available PTMU and then indicates that a selected PTMU is operational while the remaining PTMU's are left non-operational. The identification of the user of the operational PTMU is recorded in memory within the CCU. The PTMU receives data through the CCU only while residing in the CCU compartment in contact with the hardwire interface. Together with operating instructions, any data needed for operation are also input into the PTMU while the CCU down-loads data into the PTMU before release to a user.

Once the PTMU is removed from the CCU, the PTMU is then used in sales transactions involving merchandise stored in a locked inventory cart. The PTMU removed from the CCU is first latched to a selected inventory cart to provide communications between memory in the cart and memory in the PTMU. To unlock the security doors on the inventory cart, the processor in the cart may only require a data input from the PTMU through the IR interface 76. Alternatively, the system may require the user to input ID information from a magnetic card inserted into the magnetic card reader in the PTMU while it communicates with the microprocessor in the cart. Once the coded input is received from the PTMU, the security doors on the inventory cart then are automatically unlocked. The PTMU then can be used to record data from sales transactions.

For sales of merchandise, the user passes the bar-coded item to be sold over the bar code reader on the PTMU, if the PTMU remains coupled on-line to the processor in the inventory cart; or the user may remove the PTMU from the inventory cart and record bar code information from items sold by passing the wand-type bar code scanner over each item removed from the cart. The cost of each item removed is displayed on the PTMU. The user can key in the amount paid and can record credit card sales through the magnetic card reader on the PTMU. If the PTMU remains on-line to the processor in the cart, the PTMU is simply used to input bar code data into the processor in the cart which reduces the inventory count to keep a current digital data record of current inventory. The PTMU can produce an internal record of all cash sales and credit card sales to record these transactions for revenue accounting. This information also can be transferred to the processor in the cart. Once sales operations are completed, the PTMU down-loads all transaction data (inventory and cash receipts) from data storage in the cart and the PTMU is removed from the cart. The printer on the cart produces a record of all credit card transactions. After the cart is locked, the PTMU is then returned to the CCU, preferably by requiring further ID information from the user's magnetic ID card or PIN number to gain access to the PTMU region of the CCU. Once the PTMU is replaced in its compartment in the CCU, the CCU processor automatically down-loads any data gathered by the PTMU and files that data internally. Data for recording the cart's remaining inventory also can be down-loaded from the memory in the cart. The CCU will print out a record of the total cash receipts, cash balance, and credit card transactions. This receipt along with the cash is placed in an envelope and sealed and signed by the flight attendant and returned to the ground level station.

The invention has been described with reference to one embodiment of a system useful for monitoring and providing security for the sales of merchandise onboard an aircraft. Other embodiments for carrying out the invention also are possible. For instance, in a hospital environment, the dispensing of medication to patients can be monitored and controlled. Patients can have their own bar-coded ID on an arm band, and a hospital attendant can scan the bar code to display on a screen the patients pre-programmed dosages and medication. The medication itself also can be bar-coded so that its identity is known before it is administered. The bar code data can be input to the monitoring system to verify the proper medication before it is administered. Automatic billing also can be implemented, and a security system for the inventory of medication available also can be implemented, using the principles of this invention.

What is claimed is:

1. An interactive data transfer and inventory control system for monitoring inventory and distributing by authorized persons to customers comprising:

a plurality of containers for storing articles to be distributed by authorized persons;

a plurality of portable transaction monitoring units, each adapted to be operatively mounted on any one of said containers to generate a digital record of the inventory of articles in the container and, thereafter, of each article removed therefrom for distribution, said containers each having locking means permitting removal of articles from the container only while a portable transaction monitoring unit is operatively mounted thereon;

a central computing unit housing means with compartments formed therein for receiving and storing said plurality of portable transaction monitoring units, said central computing unit including digital data transfer and storage means for off-loading data from the portable transaction monitoring units to said data storage means in response to said portable transaction monitoring units being inserted into said compartments;

normally locked door means for controlling access to said compartments; and security means for selectively unlocking said door means in response to any of a plurality of coded inputs to (1) permit access to said compartments for removal and return of said portable transaction monitoring units by authorized persons and to (2) make a record of any portable transaction monitoring units removed from the central computing unit, as well as the coded input used to actuate the security means.

2. The system according to claim 1 including means for generating a digital data record of the inventory of articles in the container, and digital data transfer means for transferring said digital data record to the portable transaction monitoring unit operatively mounted on the container.

3. The system according to claim 2 in which the portable transaction monitoring unit further includes means for adjusting the digital data record in the portable transaction monitoring unit to indicate articles removed from the container, and in which said adjusted digital data record is off-loaded to the data storage means of the central computing unit.

4. The system according to claim 3 in which said digital data record is generated from bar code data storage means on the container; and including bar code data sensing means on the portable transaction monitoring unit for producing bar code data of articles removed from the container, and in which the digital data record in the portable transaction monitoring unit is adjusted in response to the bar code data sensing means.

5. The system according to claim 4 in which the portable transaction monitoring unit has a magnetic card reader for generating credit card data and means for generating cash receipts data; and in which the credit card data and cash receipts data provide a portion of said digital data record for off-loading to the central computing unit.

6. The system according to claim 1 in which the portable transaction monitoring unit includes digital data storage means for storing a digital data record of the coded input used to actuate the security means.

7. The system according to claim 1 including latching means in the compartments for enabling removal of only a selected one of the portable transaction monitoring units from the compartment in response to the coded input.

8. An interactive data transfer and inventory control system for monitoring inventory and distributions by authorized persons to customers comprising:
containers for storing articles to be distributed by authorized persons;
a portable transaction monitoring unit adapted to generate a digital record of the inventory of articles in the container and, thereafter, of each article removed therefrom for distribution, said container having locking means permitting removal of articles from the container only in response to an output signal from the portable transaction monitoring unit;
a central computing unit having housing means with compartments formed therein for receiving and storing a plurality of portable transaction monitoring units, said central computing unit including digital data transfer and storage means for off-loading data from the portable transaction monitoring units to said data storage means in response to said portable transaction monitoring units being inserted into said compartments;
normally locked door means for controlling access to said compartments; and
security means for selectively unlocking said door means in response to any of a plurality of coded inputs to (1) permit access to said compartments for removal and return of said portable transaction monitoring units by authorized persons and to (2) make a record of any portable transaction monitoring units removed from the central computing unit, as well as the coded input used to actuate the security means.

9. The system according to claim 8 including means for generating a digital data record of the inventory of articles in the container, and digital data transfer means for transferring said digital data record to the portable transaction monitoring unit operatively mounted on the container.

10. The system according to claim 9 in which the portable transaction monitoring unit further includes means for adjusting the digital data record in the portable transaction monitoring unit to indicate articles removed from the container, and in which said adjusted digital data record is off-loaded to the data storage means of the central computing unit.

11. The system according to claim 10 in which said digital data record is generated from bar code data storage means on the container; and including bar code data sensing means on the portable transaction monitoring unit for producing bar code data of articles removed from the container, and in which the digital data record in the portable transaction monitoring unit is adjusted in response to the bar code data storage means and the bar code data sensing means.

12. The system according to claim 11 in which the portable transaction monitoring unit has a magnetic card reader for generating credit card data and means for generating cash receipts data; and in which the credit card data and cash receipts data provide a portion of said digital data record for off-loading to the central computing unit.

13. The system according to claim 8 in which the portable transaction monitoring unit includes digital data storage means for storing a digital data record of the coded input used to actuate the security means.

14. The system according to claim 8 including latching means in the compartments for enabling removal of only a selected one of the portable transaction monitoring units from the compartment in response to the coded input.

15. A transaction monitoring and security system for obtaining transaction data and providing security in the sale and distribution of a plurality of articles by authorized persons to customers, the system comprising:
article storage means for containing articles for sale and distribution by authorized persons;
locking means for controlling access to articles contained in the article storage means;
means for providing a digital data record of the inventory of articles contained in the article storage means prior to removal of articles from the storage means; and
a central computing unit which includes a housing with compartments for storing separate portable transaction monitoring units, the central computing unit having security interlock means for controlling access to the portable transaction monitoring units in said compartments, the security interlock means being responsive to a coded input for permitting access to said compartments for removal and return of a selected portable transaction monitoring unit by an authorized person,
said locking means permitting access to the articles contained in the article storage means only in response to communication from the portable transaction monitoring unit removed from the central computing unit,
the portable transaction monitoring unit having data processing means for receiving the digital data record of inventory contained in the article storage means and for receiving data identifying articles removed from the article storage means to produce a digital data record of the inventory of articles removed from the container,
the central computing unit having digital data transfer and storage means for off-loading the digital data record in the portable transaction monitoring unit in response to the portable transaction monitoring unit being returned to its compartment in the central computing unit, the central computing unit also having means for recording the coded input used to actuate the security interlock means for removal of the portable transaction monitoring unit.

* * * * *